Dec. 17, 1968  F. A. GRIMMETT  3,416,228
ORTHODONIC APPLIANCE
Filed Jan. 18, 1966
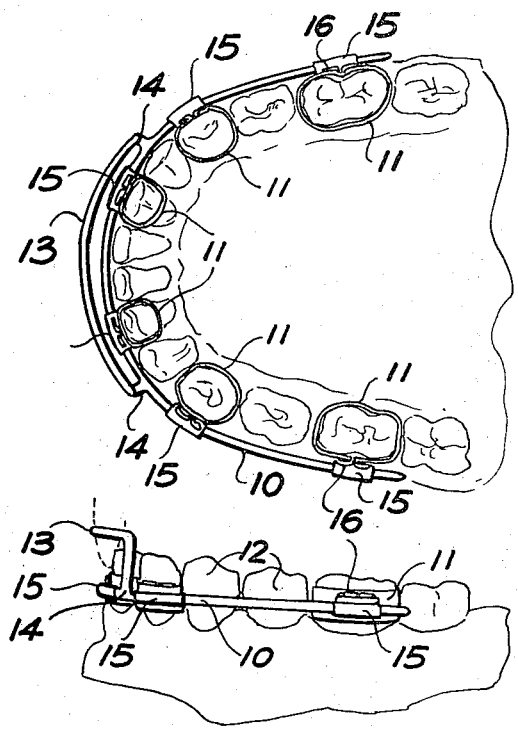
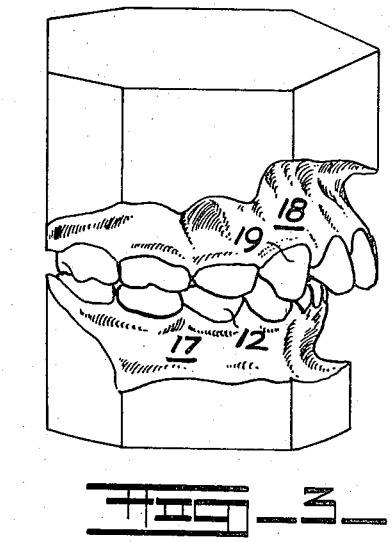
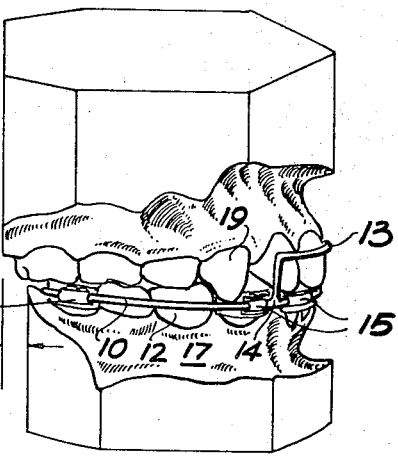
INVENTOR.
Frank A. Grimmett.
BY
W. B. Harpman
ATTORNEY.

United States Patent Office 3,416,228
Patented Dec. 17, 1968

3,416,228
ORTHODONTIC APPLIANCE
Frank A. Grimmett, 3660 Glenmere Drive,
Youngstown, Ohio 44511
Filed Jan. 18, 1966, Ser. No. 521,354
2 Claims. (Cl. 32—14)

ABSTRACT OF THE DISCLOSURE

An orthodontic appliance consisting of a curved member adapted to be positioned around the exterior surfaces of the teeth of the lower jaw and an arcuate member positioned in fixed relation above the front portion of said curved member and offset forwardly for engaging teeth of the upper jaw to limit the inward motion of the lower jaw relative thereto.

---

This invention relates to an orthodontic appliance and more particularly to a device which may be affixed to the lower teeth to provide means for bringing the jaws and tongue into a more normal position by guiding the jaws into normal relationship.

The principal object of the invention is the provision of an orthodontic appliance that may be applied to the lower teeth to act as a workable splint in bringing the jaws into a more normal relationship.

A further object of the invention is the provision of an orthodontic appliance which aids in developing mandibular basal bone to its normal potential and at the same time controls tongue thrusting and lip sucking.

A stil further object of the invention is the provision of an orthodontic appliance which can be used as a fixed or removable retainer and which frequently eliminates the need for biscupid extractions in correcting orthodontic problems.

The orthodontic appliance disclosed herein comprises a device which is applied to the lower teeth in a manner understood by those skilled in the art and provides a guide member which engages the upper teeth and prevents the wearer from moving the lower jaw inwardly beyond a desired position and, therefore, forces the wearer to hold the face in a normal position. In operation, the orthodontic appliance clears spech problems attributable to irregular mouth and jaw positions and develops face structure and muscles normally. In particular, the orthodontic appliance disclosed herein has a remarkable inhibiting effect on the "tongue thrust habit" as it seems to harness the muscle forces of the face and use them as in normal development of the facial complex.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope in the invention.

FIGURE 1 is a plan view of the appliance installed on the lower jaw.

FIGURE 2 is a side elevation thereof.

FIGURE 3 is a buccal view of an actual case with Class 2 (angles) anomaly.

FIGURE 4 is a buccal view after placing the orthodontic appliance and illustrating forward placement of mandible and wherein arrows indicate the degree of such forward placement.

By referring to the drawings and FIGURES 1 and 2 in particular it will be seen that the orthodontic appliance comprises a curved section of wire 10 formed of suitable metal and preferably of 18 gauge and shaped to conform generally to the exterior of the teeth in the lower jaw and provided with clamps, including bands 11 adjacent its ends and intermediate thereof by means of which the curved section of wire 10 is firmly positioned relative to the lower jaw and the teeth 12 therein. The forward portion of the section of curved wire 10, the portion at the left of FIGURES 1 and 2, supports and positions an arcuate guard 13 in vertically spaced relation. The end portions of the arcuate guard 13 are positioned vertically and connected to the section of cruved wire 10 and points 14 thereon.

As illustrated in FIGURES 1 and 2 of the drawings, the arcuate guard 13 is offset horizontally as well as spaced vertically with respect to the curved section of wire 10. It will be observed that the arcuate guard 13 is spaced vertically above the curved section of wire 10, a distance sufficient to position the same for engagement with the outer frontal portion of the teeth in the upper jaw as best seen in FIGURE 4 of the drawings and which action will prevent the lower jaw from being moved inwardly relative to the upper jaw and thereby serve to keep the jaws in a more normal relationship.

By again referring to FIGURES 1 and 2 of the drawings, it will be seen that the clamps securing the bands 11 to the curved section of wire 10 include tie-channel brackets 15 through which the curved section of wire 10 extends. The tie-channel brackets 15 have tubular sections 16 in which fasteners engaging the bands 11 are positioned so as to securely attach the wire 10 to the bands 11.

A person skilled in the art will observe that a plurality of the clamps, including the bands 11 engaging the teeth in the lower jaw, may be employed as desired to properly position and firmly affix the orthodontic appliance in the position herein described and illustrated.

By referring now to FIGURES 3 and 4 of the drawings, buccal views of casts of an actual case may be seen and in FIGURE 3 it will be observed that the illustrated portion of the lower jaw or mandible 17 and the teeth 12 therein are undesirably positioned inwardly with respect to the upper jaw 18 and the teeth 19 therein. In FIGURE 4 of the drawings, the same case as illustrated in FIGURE 3 is shown after the installation of the orthodontic appliance disclosed herein. It will be observed that a highly desirably forward placement of the mandible 17 has resulted, the actual relocation, being indicated by the spaced vertical dimension lines and their adjacent arrows. It will be seen that the relocation resulting from the application of the orthodontic appliance disclosed herein brings the jaws into a more normal relationship.

The installation of the orthodontic appliance in various patients has been found to definitely aid in developing mandibular basal bone to its normal potential and to activate normal developmental processes of the face and in many instances, its installation has eliminated the need of bicuspid extraction in correcting orthodontic problems. Additionally, the application of the orthodontic appliance has helped retrude mandibular protrusions. The application of the orthodontic appliance in some patients has cleared speech problems which were attributable to irregular mouth and jaw positions.

It will occur to those skilled in the art that the orthodontic appliance disclosed herein acts to hold the jaws and the tongue in normal position while the patient is swallowing and that it guides the jaws into normal relation at all times and makes room for the tongue and develops the face structure muscles in a normal pattern in addition to the hereinbefore noted inhibiting effect on the tongue thrust habit. It will further be seen that the orthodontic appliance disclosed herein is of simple construction and that it can be easily and quickly installed and adjusted and that in use in the patient's mouth it achieves the several objects of the invention.

Having thus described my invention, what I claim is:

1. An orthodontic appliance for application to the teeth of the lower jaw so as to form a limiting structure with respect to position and movement of said lower jaw relative to the upper jaw and the teeth thereof and comprising a curved wire member positioned around the exterior surfaces of the teeth of the lower jaw, means mounting said curved wire member on said teeth of the lower jaw and an arcuate wire member positioned in fixed relation above the front portion of said curved wire member and above and forward of said teeth of the lower jaw for engagement with the frontal portions of the teeth of the upper jaw, and support means interconnecting said arcuate wire member and said curved wire member.

2. The orthodontic appliance set forth in claim 1 and wherein the ends of said arcuate wire member are perpendicular relative to said curved wire member and attached to said curved wire member so as to define said interconnecting means.

References Cited

UNITED STATES PATENTS

| 1,361,661 | 12/1920 | Alexander | 32—14 |
| 1,797,481 | 3/1931 | Preston | 32—14 X |

FOREIGN PATENTS

| 1,029,981 | 5/1958 | Germany. |

LOUIS G. MANCENE, *Primary Examiner.*

C. R. WENTZEL, *Assistant Examiner.*